(12) United States Patent
Yang

(10) Patent No.: US 7,528,886 B2
(45) Date of Patent: May 5, 2009

(54) MOBILE TERMINAL HAVING IMAGE PICK-UP APPARATUS

(75) Inventor: Kyung-Tae Yang, Seoul (KR)

(73) Assignee: LG Electronics, Inc., Seoul (KR)

( * ) Notice: Subject to any disclaimer, the term of this patent is extended or adjusted under 35 U.S.C. 154(b) by 614 days.

(21) Appl. No.: 10/903,036

(22) Filed: Jul. 29, 2004

(65) Prior Publication Data
US 2005/0026659 A1 Feb. 3, 2005

(30) Foreign Application Priority Data
Jul. 31, 2003 (KR) ............... 10-2003-0053149

(51) Int. Cl.
*H04N 5/225* (2006.01)
(52) U.S. Cl. .................... 348/375; 348/373
(58) Field of Classification Search ........... 348/335, 348/373–376; 455/575.1, 575.3, 575.4
See application file for complete search history.

(56) References Cited

U.S. PATENT DOCUMENTS

| 7,046,287 B2 * | 5/2006 | Nishino et al. ......... 348/333.06 |
| 2004/0097262 A1 * | 5/2004 | Lee ........................ 455/556.1 |
| 2004/0203535 A1 * | 10/2004 | Kim et al. ................. 455/90.3 |
| 2004/0245342 A1 * | 12/2004 | Cho et al. ............. 235/472.01 |

FOREIGN PATENT DOCUMENTS

| JP | 2002-218292 | 8/2002 |
| JP | 2002-281142 | 9/2002 |
| JP | 2003-188968 | 7/2003 |
| KR | 1020030050046 A | 6/2003 |
| KR | 1020030057080 A | 7/2003 |
| KR | 1020030086017 A | 11/2003 |
| WO | WO 02/076067 A1 | 9/2002 |
| WO | WO 02/100077 A1 | 12/2002 |

* cited by examiner

*Primary Examiner*—Tuan V Ho
*Assistant Examiner*—Gevell Selby
(74) *Attorney, Agent, or Firm*—Lee, Hong, Degerman, Kang & Waimey

(57) ABSTRACT

A mobile terminal having an image pick-up apparatus comprising a housing formed at a side of the mobile terminal, the housing having a through hole, a camera body formed at the through hole of the housing, the camera body being movable in an axial direction of the housing and having a camera module, and a regulating means formed within the through hole of the housing for controlling movement of the camera body in the axial direction of the housing. The image pick-up apparatus is capable of protracting and retracting a lens of the camera module from and into the housing to thereby protect the lens from an external contaminant or an impact.

17 Claims, 8 Drawing Sheets

MOBILE TERMINAL HAVING IMAGE PICK-UP APPARATUS

CROSS-REFERENCE TO RELATED APPLICATIONS

Pursuant to 35 U.S.C. § 119(a), this application claims the benefit of earlier filing date and right of priority to Korean Application No. 2003-53149, filed on Jul. 31, 2003, the contents of which is hereby incorporated by reference herein in its entirety.

BACKGROUND OF THE INVENTION

1. Field of the Invention

The present invention relates to a mobile terminal and, more particularly, to a mobile terminal having an image pick-up apparatus capable of protracting and retracting a lens from and into a housing to thereby protect the lens from an external contaminant or an impact.

2. Description of the Related Art

FIG. 1 is a perspective view showing a related mobile terminal having an image pick-up apparatus. As shown, the mobile terminal 1 comprises a main body 10 having a main printed circuit board (PCB) and an information input unit 11, a folder 20 having a display unit 21, a hinge unit 30 for rotating the folder 20 about the main body 10, and an image pick-up apparatus 40 installed at a side of the hinge unit 30.

The main body 10 and the folder 20 are electrically connected by a flexible printed circuit board (FPCB). The main body 10 and the image pick-up apparatus 40 can also be electrically connected to each other.

The hinge unit 30 comprises a first hinge part 31 formed integrally with the main body 10, a second hinge part 33 formed integrally with the main body 10 and spaced apart from the first hinge part 31, a third hinge part 35 formed integrally with the folder 20 and coaxially mounted between the first and second hinge parts 31 and 33, and a hinge pin (not shown) inserted through the first, second and third hinge parts 31, 33 and 35, respectively.

The hinge unit 30 allows the folder 20 to be pivoted about the main body 10 centering on a rotation axis (a-a).

The image pick-up apparatus 40 installed at a side of the hinge unit 30 comprises a camera module including a lens 41 and a camera housing 43 with the camera module housed therein. A lens hole 45 is formed at a side of the camera housing 43. The lens 41 is exposed through the lens hole 45. The camera housing 43 and the camera module installed therein are integrally moved together.

A connection unit (not shown) connected with the main PCB inside the main body 10 is provided at a side of the camera module. The connection unit is installed to penetrate the first hinge part 31 and connects to the main PCB through a FPCB. Namely, one end of the FPCB is connected to the main PCB and the other end of the FPCB is windingly connected to the connection unit of the camera module.

A knob 47 is formed at an outer side end of the camera module 40 in order to control an angle of the lens 41 for photographing.

The method for operating the mobile terminal having the image pick-up apparatus constructed as described above, especially, the method for operating the image pick-up apparatus is as follows.

When a user wants to photograph an object using the image pick-up apparatus 40, the user manipulates the knob 47 to rotate the camera housing 43 in a direction that the object is positioned in. The user then takes a photograph while viewing an image of the object on the display unit.

However, the related art mobile terminal having the image pick-up apparatus has the following problems.

First, because the lens of the related art image pick-up apparatus installed at a side of the hinge unit is exposed at all times, the lens can be contaminated by dust or other types of contaminants. Thus, the quality of a photographed image may be degraded.

Additionally, the lens is susceptible to permanent damage because the exposed lens can be easily struck by an external impact.

Moreover, the viewable area of the image pickup apparatus is limited due to a dead zone, an area within the rotation angle of the image pickup apparatus obstructed by parts of the mobile terminal such as the main body or the folder. Thus, as the image pickup apparatus is rotated to search an object, its view of the object is blocked if the object falls within the dead zone. Alternatively, the rotation angle of the apparatus may unnecessarily be limited in order to avoid the dead zone. Therefore, the design of the apparatus is restricted according to the installation of the camera module.

SUMMARY OF THE INVENTION

The present invention provides a mobile terminal having an image pick-up apparatus capable of protracting and retracting a lens from and into a housing to thereby protect the lens from an external contaminant or an impact.

To achieve these and other advantages and in accordance with the purpose of the present invention, as embodied and broadly described herein, there is provided a mobile terminal having an image pick-up apparatus comprising a housing formed at a side of a mobile terminal, the housing having a through hole, a camera body formed at the through hole of the housing, the camera body being movable in an axial direction of the housing and having a camera module, and a regulating means formed within the through hole of the housing for controlling movement of the camera body in the axial direction of the housing.

In one aspect of the invention, the regulating means allows the camera body to be protracted from and retracted to the housing wherein the camera module of the camera body comprises a lens capable of being protracted from and retracted to the housing.

In another aspect of the invention, the regulating means comprises a cam body formed along the circumference of the camera body, a stopper rotatably coupled with the cam body, a guide member formed at an inner circumferential surface of the through hole of the housing, the guide member having a guide cam for guiding movement of the stopper, and a biasing member installed within the housing for applying a force to the stopper in an axial direction of the housing, wherein the cam body comprises a plurality of sawteeth for engaging the stopper, the stopper rotates along with the sawteeth, the guide cam guides the stopper for positioning a lens of the camera body inside the housing and for positioning a lens of the camera body outside the housing, and the biasing member applies a force to the stopper such that the lens is protruded outside the housing.

In yet another aspect of the invention, the stopper comprises a flange part formed at an edge of the stopper, and at least one protrusion formed at an outer circumferential surface of the flange part for engaging the sawteeth of the cam body to rotate the stopper along the sawteeth.

In yet a further aspect of invention, the guide cam of the guide member comprises a plurality of guide grooves formed along the circumference of the guide member for guiding the at least one protrusion of the stopper in the axial direction of the guide member, a first settling portion formed at an inner end of the plurality of guide grooves such that the at least one protrusion of the stopper can be settled therein when the lens of the camera body is positioned outside the housing, and a plurality of cam portions formed between the plurality of guide grooves, the cam portions having second settling portions such that the at least one protrusion of the stopper can be settled therein so as for the lens to be positioned inside the housing, the cam portions guiding the at least one protrusion of the stopper into either of the guide grooves and the second settling portions.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

The present invention relates to a mobile terminal having an image pick-up apparatus capable of protracting and retracting a lens from and into a housing.

Figure 1:
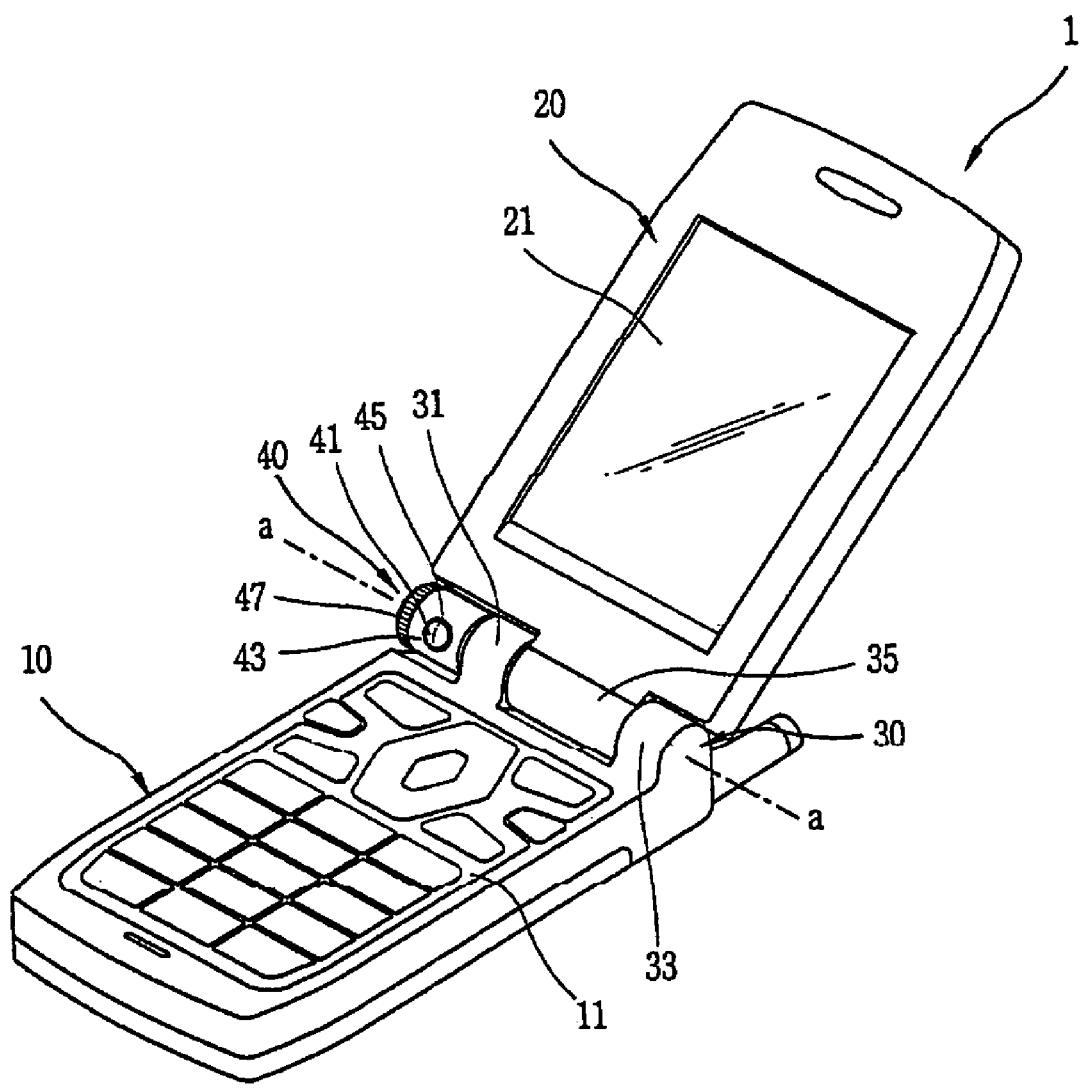
FIG. 1 is a perspective view showing a related art mobile terminal having an image pick-up apparatus.
Figure 2:
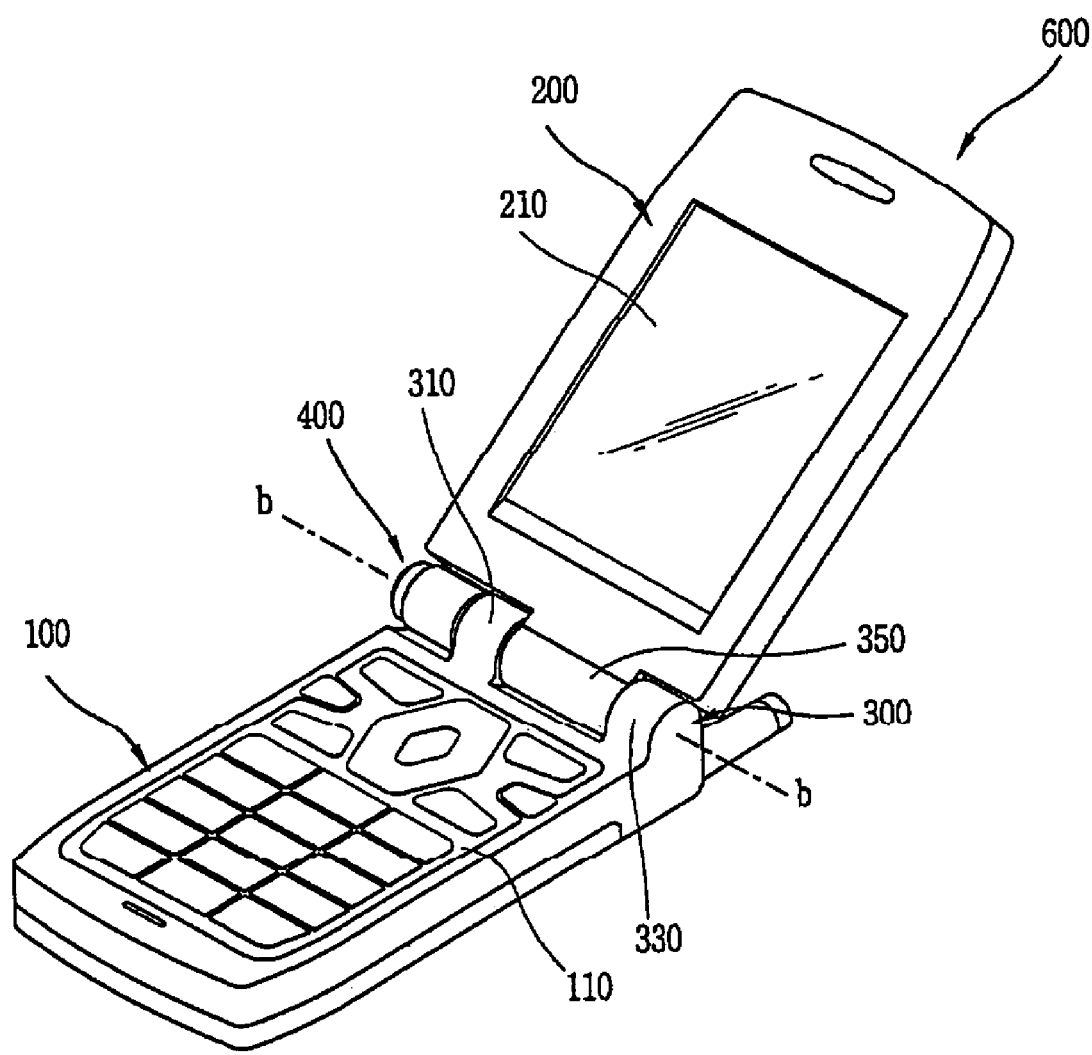
FIG. 2 is a perspective view showing a mobile terminal having an image pick-up apparatus in accordance with a preferred embodiment of the present invention.

As shown in FIG. 2, a mobile terminal 600 in accordance with the present invention comprises a main body 100 having a main printed circuit board (PCB) and an information input unit 110, a folder 200 having a display unit 210, a hinge unit 300 rotatably connecting the folder 200 with the main body 100, and an image pick-up apparatus 400 installed at a side of the hinge unit 200.

The main body 100 and the folder 200 are electrically connected by a flexible printed circuit board (FPCB). The main body 100 and the image pick-up apparatus 400 are also electrically connected to each other.

The hinge unit 300 comprises a first hinge part 310 formed integrally with the main body 100, a second hinge part 330 formed integrally with the main body 100 and spaced apart from the first hinge part 310, a third hinge part 350 formed integrally with the folder 200 and coaxially mounted between the first and second hinge parts 310 and 330, and a hinge pin (not shown) inserted through the first, second and third hinge parts 310, 330 and 350, respectively. Accordingly, the hinge unit 300 allows the folder 200 to be pivoted about the main body 100 centering on a rotation axis (b-b).

The image pick-up apparatus 400 of the mobile terminal in accordance with the present invention will now be described.

Figure 3:
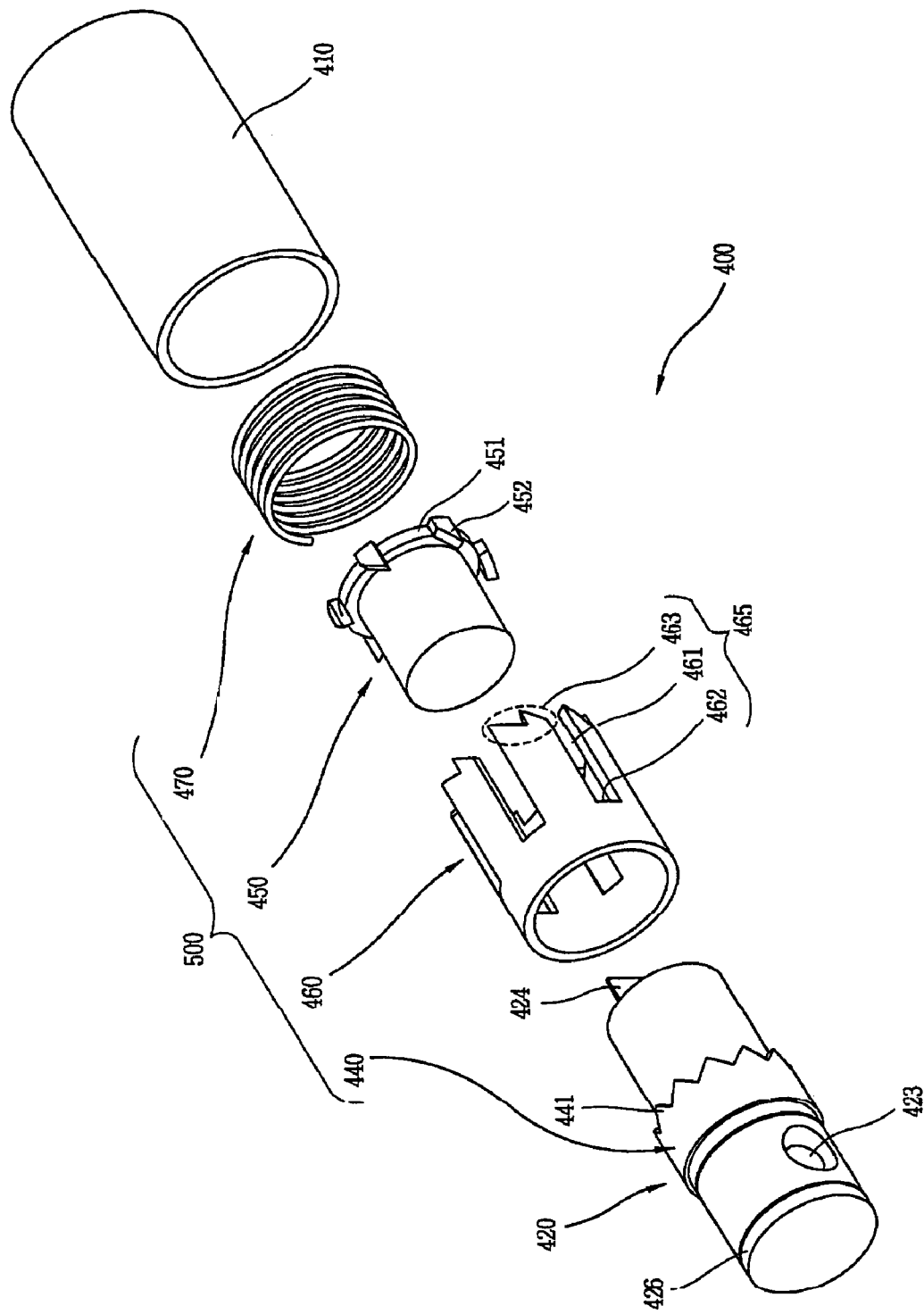
FIG. 3 is an exploded perspective view showing the image pick-up apparatus in accordance with a preferred embodiment of the present invention.
Figure 4:
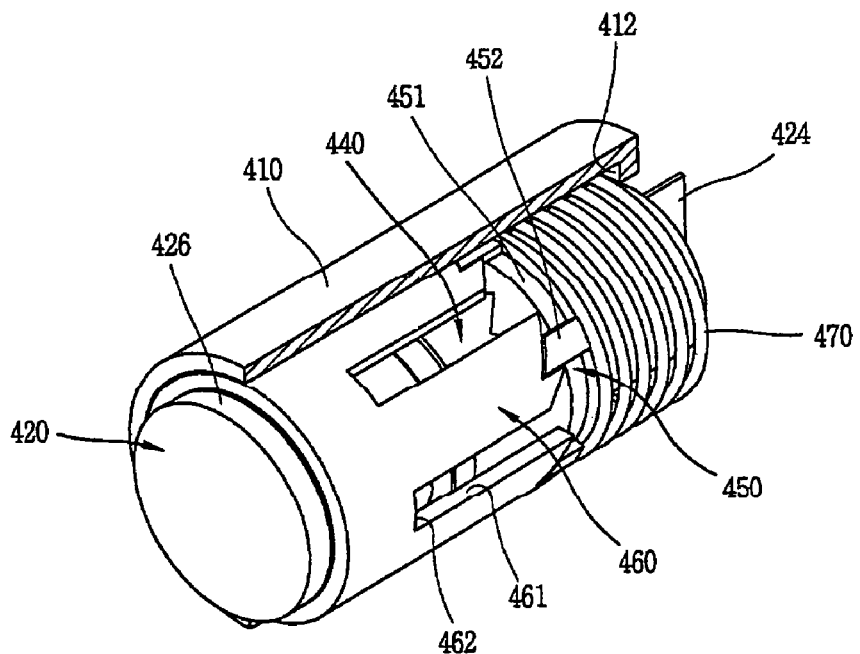
FIG. 4 is a partially cut prospective view showing a lens of the image pick-up apparatus mounted inside a housing in accordance with a preferred embodiment of the present invention.
Figure 5:
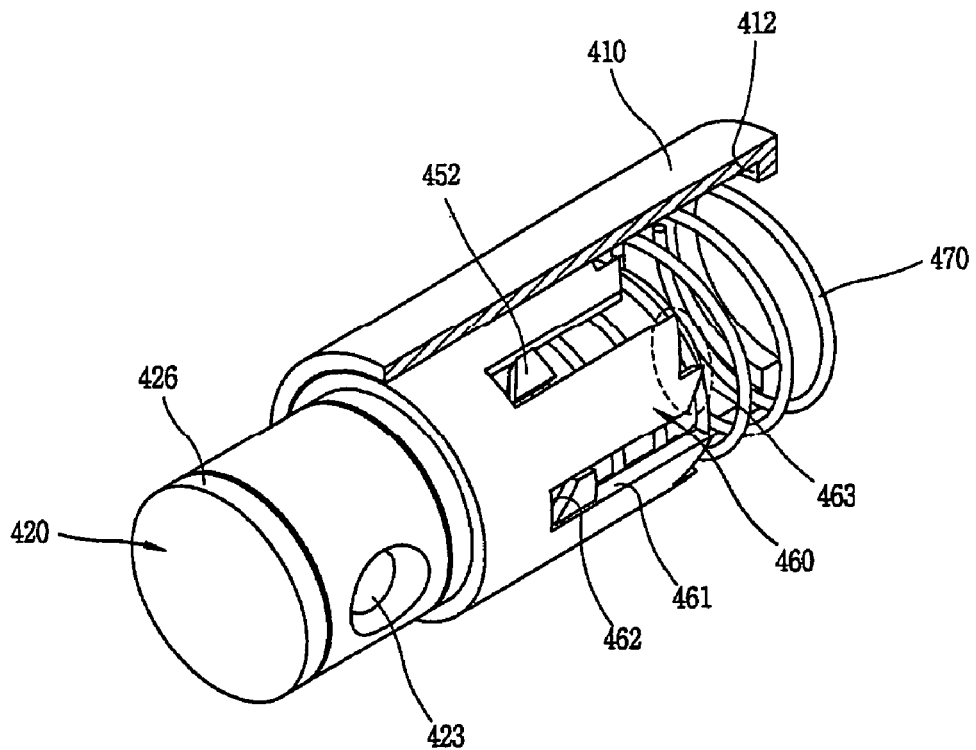
FIG. 5 is a partially cut prospective view showing a lens of the image pick-up apparatus exposed from the housing in accordance with a preferred embodiment of the present invention.

As shown in FIGS. 3-5, the image pick-up apparatus 400 comprises a housing 410 formed at a side of the mobile terminal 600. Preferably, the housing 410 is coaxially installed at a side of the hinge unit 300 along the rotation axis (b-b) and having a through hole therein extended in a longitudinal direction with a certain diameter. The apparatus 400 further comprises a camera body 420 formed within the through hole so as to be moved in an axial direction of the housing 410 and having a camera module 424 with a lens 423 provided therein. The apparatus 400 also comprises a regulating means 500 formed within the through hole for controlling movement of the camera body 420 in the axial direction of the housing. Preferably, the regulating means allows the camera body 420 to be selectively protracted from and retracted to the housing 410.

A knob 426 is formed at an outer end of the camera body 420 for adjusting an angle of the lens 423 during photographing.

When photographing is not performed, the lens 423 is usually housed within the housing 410 along with the regulating means 500. When photographing is performed, the lens 423 is protruded outwardly from the housing 410.

The regulating means 500 comprises a cam body 440 formed along the circumference of the camera body 420, a stopper 450 rotatably coupled with the cam body 440, a guide member 460 formed at an inner circumferential surface of the through hole of the housing, the guide member having a guide cam 465 for guiding movement of the stopper 450, and a biasing member 470 installed within the housing for applying a force to the stopper 450 in an axial direction of the housing 410. Preferably, the cam body 440 comprises a plurality of saw teeth 441 for engaging the stopper 450. When engaged, the stopper 450 rotates along with the sawteeth 441. The guide cam 465 guides the stopper 450 for positioning the lens 423 inside or outside the housing 410. The biasing member 470 applies a force to the stopper 450 such that the lens 423 is protruded outside the housing 410. Preferably, the biasing member 470 is a spring installed within the housing which applies a force to the stopper in an axial direction so as to push the stopper outside the housing.

The construction of the regulating means 500 will now be described. Preferably, the cam body 440 is in a cylindrical shape and is formed along a circumference of the camera body 420. The sawteeth 441 are formed at an end of the cam body 440 and have a triangular shape. A portion of the stopper 450 is rotatably inserted into the cam body 440 in an axial direction of the cam body 440 to control axial movement of the camera body 420.

Preferably, the stopper 450 is in a cylindrical shape and comprises a flange part 451 formed at an edge of the stopper. At least one protrusion 452 is formed at an outer circumferential surface of the flange part 451 and engages the sawteeth 441 of the cam body 440 to rotate the stopper 450 along the sawteeth 441. It is noteworthy that the stopper 450 can be modified in various forms as necessary and is not limited to the cylindrical shape.

Figure 6:
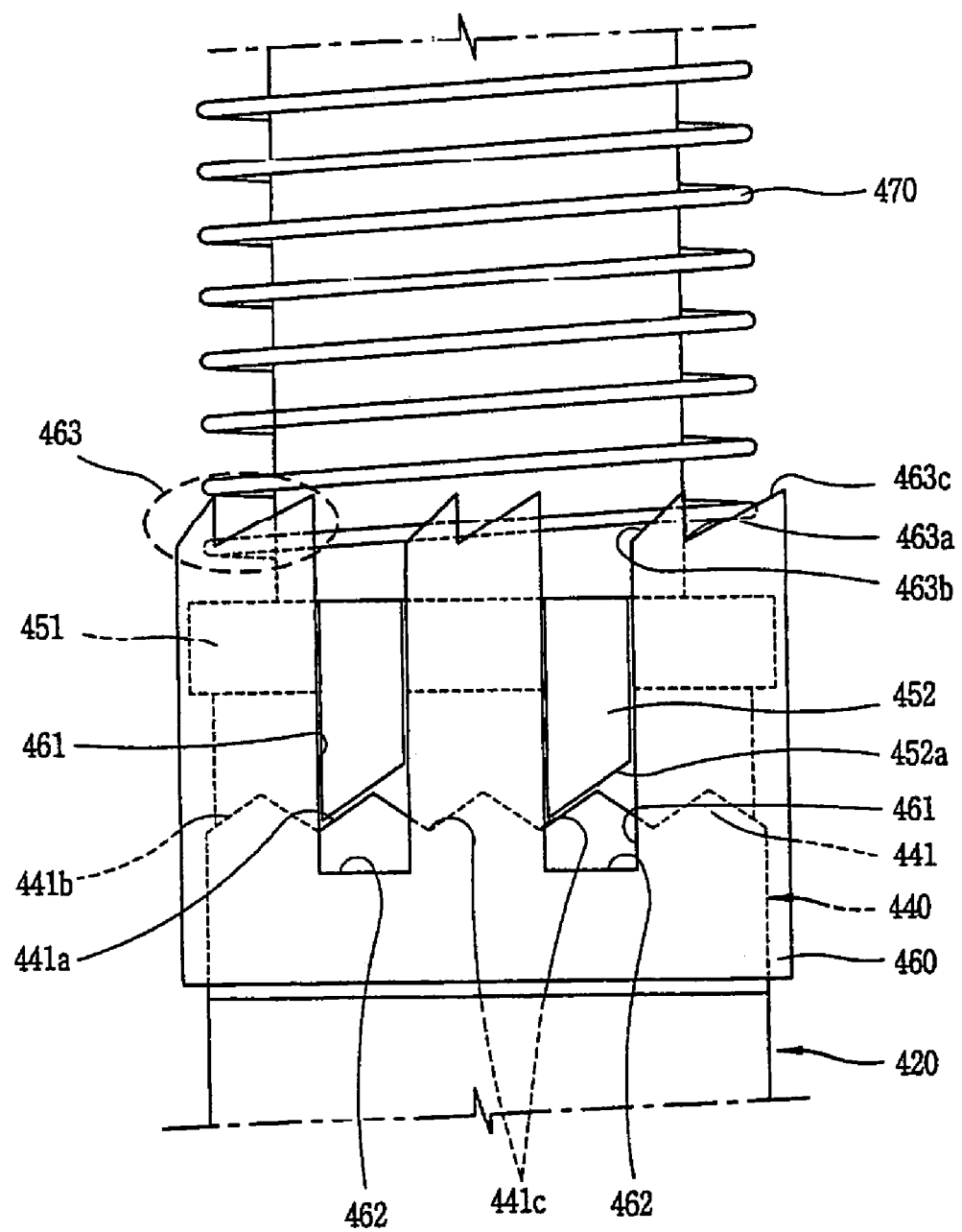
FIGS. 6 and 7 are partially cut side views of the image pick-up apparatus showing an operation state of a regulating means for exposing the lens from the housing in accordance with a preferred embodiment of the present invention.
Figure 7:
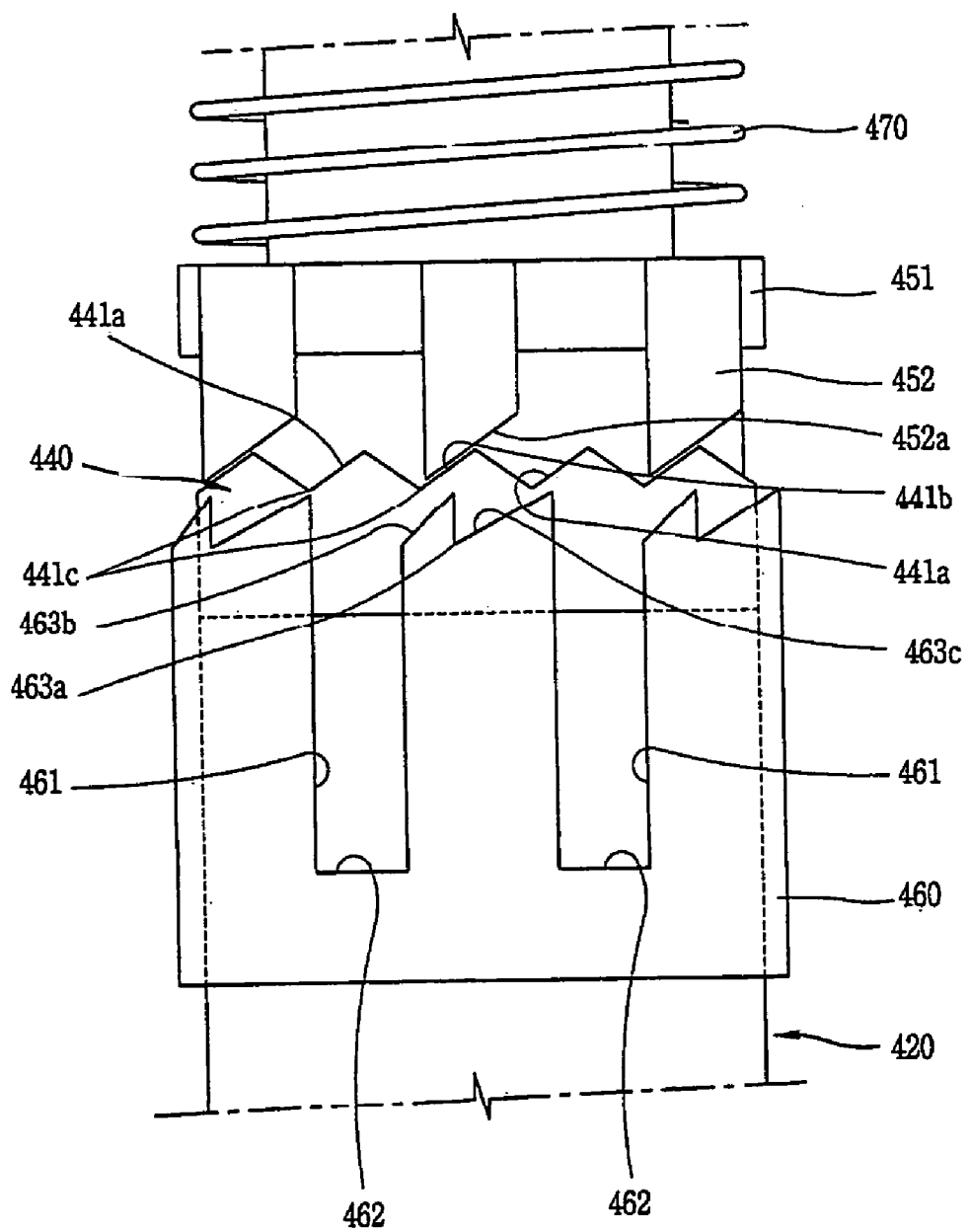
Figure 8:
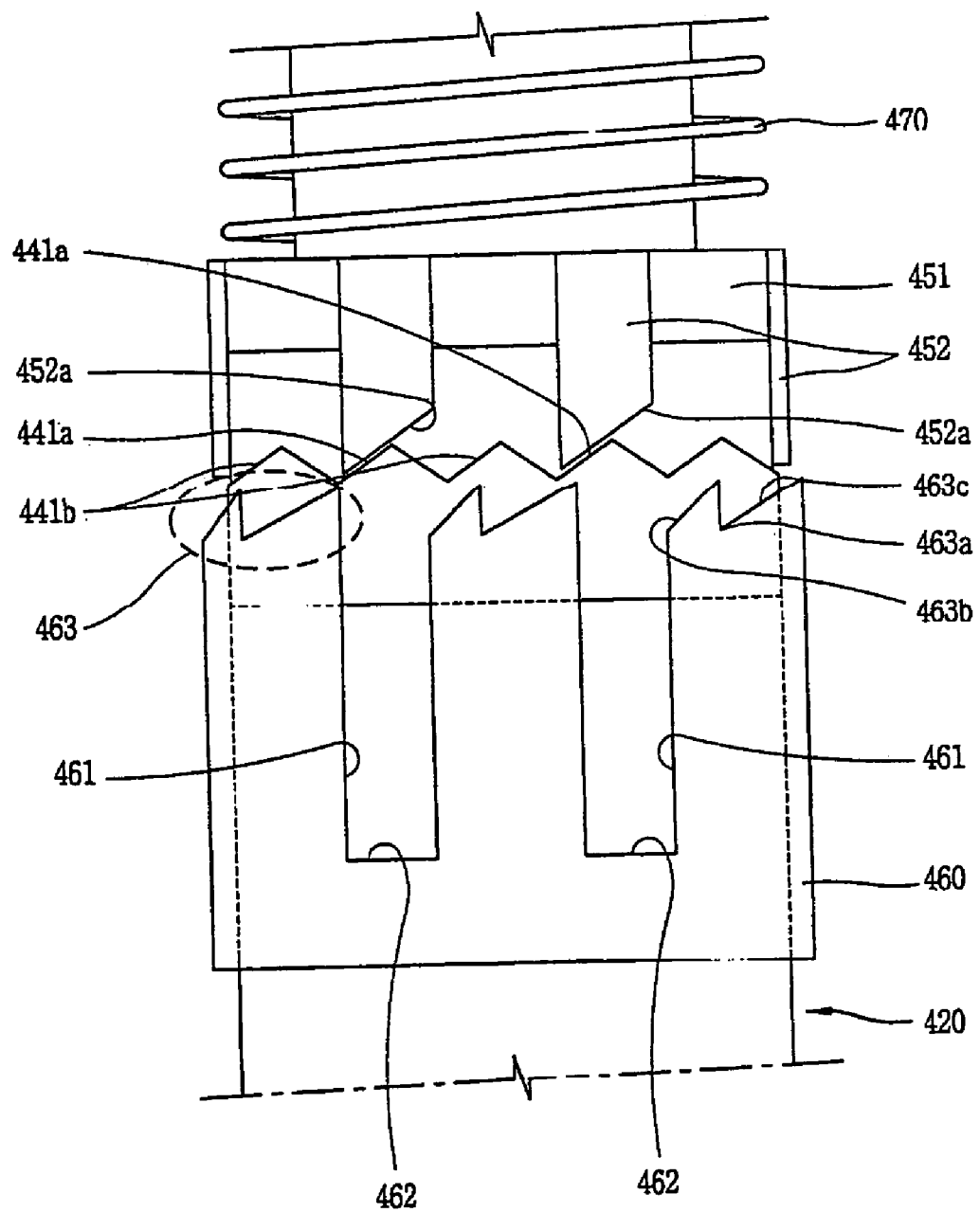
FIG. 8 is a partially cut side view of the image pick-up apparatus showing the operation state of the regulating means in accordance with a preferred embodiment of the present invention.

At least one or more protrusions 452 are preferably formed at regular intervals along the outer circumferential surface of the flange part 451. The protrusions 452 can be separately fabricated and installed at the stopper 451, and can be also modified in various forms. Moreover, each protrusion 452 may have a wedge-shaped end so that it can be moved along slope faces 441a and 441b and valleys 441c of the sawteeth 441, as shown in FIG. 6.

The guide member 460 is preferably in a cylindrical shape and has a through hole formed therein in an axial direction of the housing 410 so that the stopper 450 can be moved in the axial direction of the guide member 460. The guide member 460 can be also integrally formed with the housing 410 at the inner circumference of the through hole of the housing 410.

The guide cam 465 of the guide member 460 comprises a plurality of guide grooves 461 formed along the circumference of the guide member 460 for guiding the at least one protrusion 452 of the stopper 450 in the axial direction of the guide member 460, a first settling portion 462 formed at an inner end of the plurality of guide grooves 131 such that the at least one protrusion 452 of the stopper 450 can be settled therein when the lens 423 of the camera body 420 is positioned outside the housing 410, and a plurality of cam portions 463 formed between the plurality of guide grooves 461, the cam portions 463 having second settling portions 463a such that the at least one protrusion 452 of the stopper 450 can be settled therein so as for the lens 423 to be positioned inside the housing 410, the cam portions 463 guiding the at least one protrusion 452 of the stopper into the guide grooves 461 or into the second settling portions 463a.

Preferably, the plurality of guide grooves 461 are formed at regular intervals parallel to the axial direction of the guide member 460, but not limited thereto. Namely, the guide grooves 461 can be formed in a spiral form and can be modified in other various forms so long as it can guide the at least one protrusion 452 in the axial direction of the guide member 460.

Preferably, the plurality of cam portions 463 respectively have a pair of sawteeth having slope faces inclined in a certain direction and a valley between the pair of sawteeth. The valley corresponds to the second settling portion 463a in which the at least one protrusion 452 of the stopper 450 is settled when the lens 423 is positioned inside the housing 410.

The slope faces of the pair of sawteeth of each cam portion 463 comprises an outer slope face 463b extending from a side wall of the guide groove 461 for guiding the at least one protrusion 452 of the stopper 450 to the guide groove 461, and an inner slope face 463c for guiding the at least one protrusion 452 of the stopper 450 to the second settling portion 463a.

As stated earlier, the biasing member 470 is preferably a spring 470 formed at an inner side of the housing 410 and applies an axial force to the stopper 450 to push the stopper to the outside of the housing 410. Preferably, a first end of the spring is tightly attached to an end of the flange part 451 of the stopper 450, and second end of the spring is tightly attached to a step portion 412 formed within the housing 410.

As shown in FIGS. 6 through 9, the mutual operational states among the elements of the regulating means 500 will be described.

Preferably, when the protrusions 452 of the stopper 450 are moved in a direction of compressing the biasing member 470 in the guide grooves 461, the protrusions 452 are supported by both side walls of the guide grooves 461. Thus, the stopper 450 does not make a relative movement in the circumferential direction with respect to the cam body 440. Namely, with the slope faces 452a of an end of the protrusions 452 being in contact with certain portions of the slope faces 441a (hereinafter referred to as the "first slope faces") of the sawteeth 441 of the cam body 440 positioned in the guide grooves 461, the protrusions 452 are moved in the axial direction of the guide member 460 along both side walls of the guide grooves 461.

When the protrusions 452 are released from the guide grooves 461, they are moved along the first slope faces 441a to the valleys 441c of the sawteeth 441 of the cam body 440. At this time, as the cam body 440 is moved in the axial direction of the housing 410 due to a restoring force of the biasing member 470, the protrusions 452 are guided to the inner slope faces 463c of the cam portions 463, and are mounted on the second settling portions 463b, the valleys of the cam portions 463.

Figure 9:
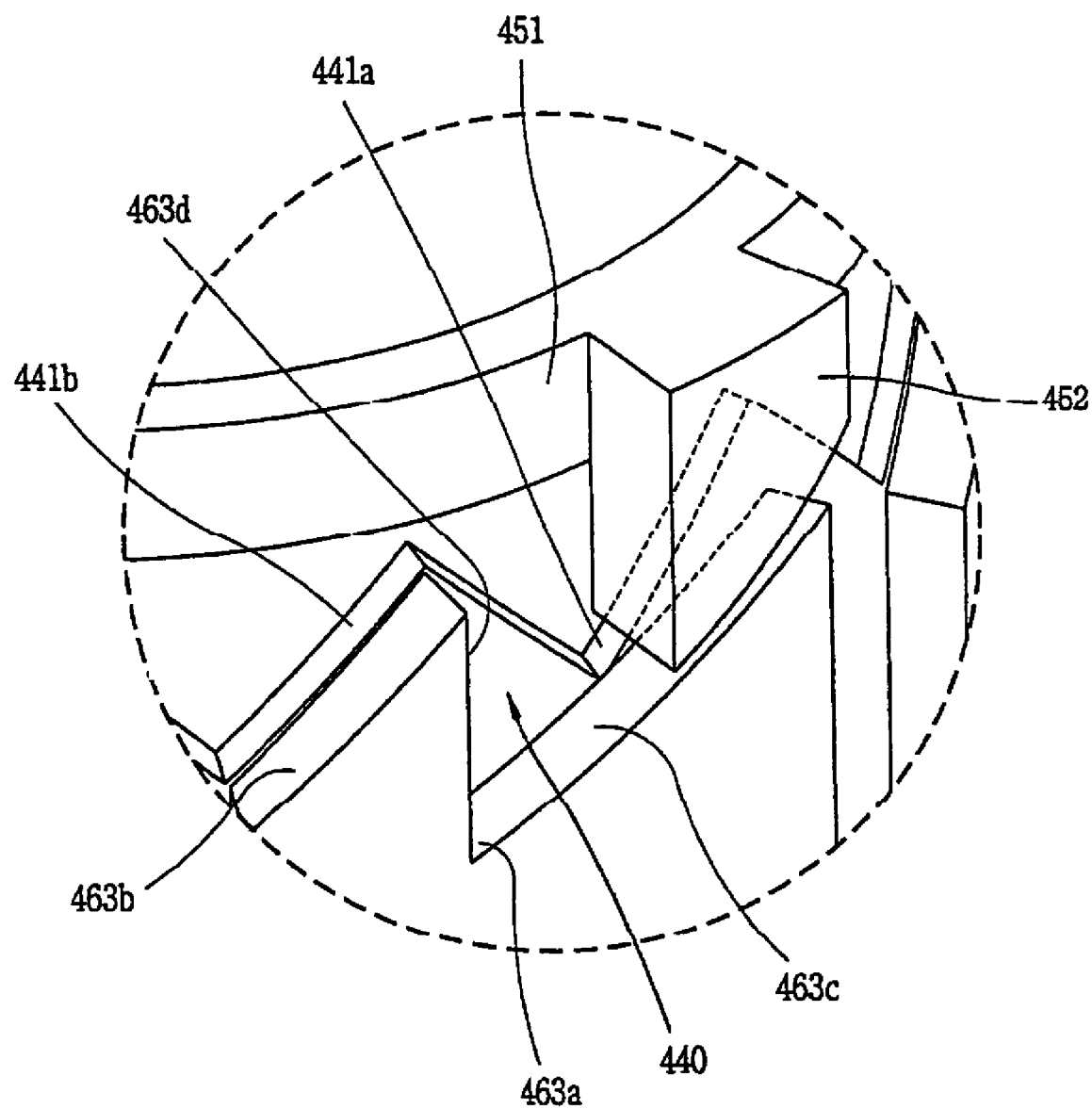
FIG. 9 is a perspective view of the regulating means in accordance with a preferred embodiment of the present invention.

When the protrusions 452 are mounted on the second settling portions 463b, if the cam body 440 is moved in the axial direction of the housing 410 while applying a compression force to the biasing member 470, the protrusions 452 are moved along inner vertical walls 463d, as shown in FIG. 9, extended from the second settling portions 463b. When the protrusions 452 are released from the inner vertical walls 463d, the slope faces 452a of the protrusions 452 are moved to the valleys 441c of the sawteeth 441 of the cam body 440 along the slope faces 441b (hereinafter referred to as the "second slope faces"), which are in contact with the slope faces 452a of the protrusions 452 at the second settling portions 463b.

At this time, as the cam body 440 is moved in the axial direction of the housing 410 due to the restoring force of the biasing member 470, the protrusions 452 are guided to the outer slope faces 463b of the cam portions 463. The protrusions are then moved in the axial direction of the housing 410 along the guide grooves 461 and mounted on the first settling portions 462.

The mobile terminal having the image pick-up apparatus in accordance with the present invention operates as follows.

When a user wants to photograph an object by using the image pick-up apparatus, the user can press an exposed side of the camera body 420 outside the housing 410. At this time, the cam body 440 is moved in the inward direction of the housing 410 while pressing the biasing member 470. Meanwhile, the protrusions 452 of the stopper 450 being in contact with the second slope faces 441b of the sawteeth 441 of the cam body 440 are moved along the vertical inner walls 463d of the cam portions 463 of the guide member 460. When the protrusions 452 are released from the vertical inner walls 463d, the protrusions 452 of the stopper 450 are moved to the valleys 441c of the sawteeth 441 along the second slope faces 441b. At this time, the user releases a vertical force applied to a side of the camera body 420. Then, owing to the restoring force of the biasing member 470 applied to the stopper 450, the protrusions 452 of the stopper 450 are moved to the guide grooves 461 along the outer slope faces 463b of the cam portions 463, and resultantly, the protrusions 452 are mounted at the first settling portions 462. At this time, the lens 423 of the camera body 420 is protruded outwardly of the housing 410.

The user may then grasp the knob 426 formed at a side of the camera body 420, rotate the camera body 420 to fit the lens 423 to the object, and photograph the object while viewing an image of the object displayed through the display unit 210 of the folder 200.

After taking the photograph, in order to retract the lens 423 into the housing 410, the user can press the exposed side of the camera body 420 outside the housing 410. Then, a compression force is applied to the biasing member 470 and the cam body 440 is moved in the inward direction of the housing 410. At this time, the protrusions 452 of the stopper 450 are moved away from the first settling portions 462 in the axial direction of the housing 410 along the guide groove 461 in a state of being in contact with the first slope faces 441a of the sawteeth 441 of the cam body 440. When the protrusions 452 are released from the guide grooves 461, the protrusions 452 are moved to the valleys 441c of the sawteeth 441 of the cam body 440 along the first slope faces 441a. At this time, the user releases the vertical force applied to the side of the camera body 420. Then, owing to the restoring force applied to the stopper 450 by the biasing spring 470, the protrusions 452 are moved to and then mounted on the second settling portions 463b along the inner slope faces 463c of the cam portions 463. At this time, the lens 423 of the camera body 420 is stably positioned inside the housing 410.

As so far described, the mobile terminal having an image pick-up apparatus of the present invention has many advantages.

For example, first the lens of the mobile terminal can be selectively mounted outside or inside the camera housing, so it can be prevented from being contaminated and damaged.

Second, when the image pick-up apparatus is rotated to search the object, there is no dead zone covered by the main body and the folder because of the lens being protruded from the housing. Thus, there is no restriction to the rotation angle, and thus, the user can conveniently photograph the object without obstruction.

Third, because the lens can be easily projected from the camera housing or mounted in the camera housing by simply pressing the camera body in the axial direction, the user is convenienced giving rise to user satisfaction.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A mobile terminal having an image pick-up apparatus, the terminal comprising:
   a housing formed at a side of the mobile terminal, the housing having a through hole;
   a camera body formed at the through hole of the housing, the camera body being movable in an axial direction of the housing and having a camera module comprising a lens;
   a regulating means formed within the through hole of the housing for controlling movement of the camera body in the axial direction of the housing to protract the camera body out of the housing and retract the camera body into the housing; and
   a knob formed at an outer side of the camera body for rotating the camera body to adjust an angle of the lens, wherein the regulating means comprises:
   a cam body formed along a circumference of the camera body, the cam body comprising a plurality of sawteeth;
   a stopper rotatably coupled with the cam body, the stopper comprising a flange part formed at an edge of the stopper and at least one protrusion formed at an outer circumferential surface of the flange part for engaging the plurality of sawteeth of the cam body to rotate the stopper along the plurality of sawteeth;
   a guide member formed at an inner circumferential surface of the through hole of the housing, the guide member having a guide cam for guiding movement of the stopper; and
   a biasing member installed within the housing, the biasing member applying a force to the stopper in the axial direction of the housing.

2. The terminal of claim 1, wherein the lens is capable of being protracted from and retracted to the housing.

3. The terminal of claim 1, wherein
   the guide cam guides the stopper in order to position the lens of the camera body inside or outside the housing and the biasing member applies the force to the stopper such that the lens protrudes from the housing.

4. The terminal of claim 1, wherein the sawteeth have a triangular shape.

5. The terminal of claim 1, wherein the cam body has a cylindrical shape.

6. The terminal of claim 1, wherein a portion of the stopper is inserted into the cam body in an axial direction of the cam body to control axial movement of the camera body.

7. The terminal of claim 1, wherein a plurality of protrusions are formed at regular intervals along the outer circumferential surface of the flange part.

8. The terminal of claim 1, wherein the at least one protrusion has a wedge-shaped end such that the at least one protrusion moves along slope faces of the plurality of sawteeth.

9. The terminal of claim 1, wherein the guide member comprises a through hole for moving the stopper in an axial direction of the guide member.

10. The terminal of claim 1, wherein the guide member is integrally formed with the housing at the inner circumferential surface of the through hole of the housing.

11. The terminal of claim 1, wherein the guide cam of the guide member comprises:
   a plurality of guide grooves formed along a circumference of the guide member for guiding the at least one protrusion of the stopper in an axial direction of the guide member;
   a first settling portion formed at an inner end of the plurality of guide grooves such that the at least one protrusion of the stopper can be settled therein when the lens of the camera body is positioned outside the housing; and
   a plurality of cam portions formed between the plurality of guide grooves, the plurality of cam portions having second settling portions such that the at least one protrusion of the stopper can be settled therein in order to position the lens inside the housing, the plurality of cam portions guiding the at least one protrusion of the stopper into the plurality of guide grooves or the second settling portions.

12. The terminal of claim 11, wherein the plurality of guide grooves are formed at regular intervals in the axial direction of the guide member.

13. The terminal of claim 11, wherein each of the plurality of cam portions has a plurality of sawteeth having slope faces inclined in a certain direction.

14. The terminal of claim 13, wherein each second settling portion comprises a valley between the plurality of sawteeth.

15. The terminal of claim 13, wherein the slope faces of each of the plurality of cam portions comprises:
- an outer slope face extending from each of the plurality of guide grooves for guiding the at least one protrusion of the stopper to the plurality of guide grooves; and
- an inner slope face extending from a second settling portion for guiding the at least one protrusion of the stopper to the second settling portion.

16. The terminal of claim 1, wherein the biasing member comprises a spring installed within the housing for applying the force to the stopper in an axial direction of the guide member in order to push the stopper outside the housing.

17. The terminal of claim 16, wherein a first end of the spring is coupled to an end of the flange part of the stopper and a second end of the spring is coupled to a step portion formed within the housing.

* * * * *